United States Patent [19]

Birkholz et al.

[11] Patent Number: 4,895,747

[45] Date of Patent: Jan. 23, 1990

[54] PRESSURE SENSITIVE ADHESIVE LABEL

[75] Inventors: Ronald B. Birkholz, White Bear Lake; Richard R. Riter, St. Paul, both of Minn.

[73] Assignee: Minnesota Mining and Manufacturing Company, St. Paul, Minn.

[21] Appl. No.: 223,278

[22] Filed: Jul. 22, 1988

[51] Int. Cl.[4] .......................... B32B 7/06; B32B 7/12

[52] U.S. Cl. .......................................... 428/42; 428/40; 428/43; 428/350; 428/354; 428/906

[58] Field of Search ..................... 428/40, 42, 43, 350, 428/354, 906

[56] References Cited

U.S. PATENT DOCUMENTS

| | | | |
|---|---|---|---|
| 24,906 | 12/1860 | Ulrich | 206/59 |
| 2,532,011 | 11/1950 | Dahlquist et al. | 154/53.5 |
| 2,607,711 | 8/1952 | Hendricks | 117/122 |
| 3,296,723 | 1/1967 | Gobel | 40/2 |
| 3,575,788 | 4/1971 | Funk et al. | 161/167 |
| 3,865,770 | 2/1975 | Blake | 260/27 R |
| 4,331,576 | 5/1982 | Colon et al. | 524/271 |
| 4,388,432 | 6/1983 | Eskay | 524/388 |
| 4,413,080 | 11/1983 | Blake | 524/187 |
| 4,569,960 | 2/1986 | Blake | 524/145 |

FOREIGN PATENT DOCUMENTS 1220764 4/1987 Canada .

*Primary Examiner*—Alexander S. Thomas
*Attorney, Agent, or Firm*—Donald M. Sell; Walter N. Kirn; Leland D. Schultz

[57] ABSTRACT

A label for application to a support surface. The label includes a moisture dissipative layer applied to a major surface of a sheet member. A layer of pressure sensitive adhesive is applied to the moisture dissipative layer opposite the sheet member for securing the label to a support surface. The label may be removed from the support surface without damage to the label by dissipating the moisture dissipative layer.

13 Claims, 2 Drawing Sheets

PRESSURE SENSITIVE ADHESIVE LABEL

FIELD OF THE INVENTION

This invention relates to pressure sensitive adhesive printed labels for application to a support surface.

BACKGROUND OF THE INVENTION

Labels have been constructed in the past for application to a support surface with a moisture activated adhesive. For instance, the label may take the form of a postage stamp having a moisture activated adhesive layer that secures the postage stamp to an envelope, package or like support surface. However, moisture activated adhesives may be exposed to excessive levels of humidity during storage, causing unintentional adherence to a surface or to other labels. Application of the label may require cumbersome and inconvenient moistening equipment, or potentially unsanitary contact by the user. It is also sometimes desirable to remove a label, such as a stamp, by immersing the label in water so as to dissolve the moisture activated adhesive, permitting the label to be removed from the support surface without damage to the label.

Pressure sensitive adhesives have also been used to apply a label to a support surface. Pressure sensitive adhesives are available that are superior to moisture activated adhesives in adhesive strength, shelf life and convenience. However, a pressure sensitive adhesive that securely bonds a label to a support surface is frequently difficult to remove from the support surface without damaging the label.

SUMMARY OF THE INVENTION

A label for use with a support surface including a sheet member having first and second opposing major surfaces. A layer of moisture dissipative material is applied to the second major surface of the sheet member. A pressure sensitive adhesive is applied to the moisture dissipative layer opposite the second major surface of said sheet member for adhering said sheet member to the support surface. The sheet member may be removed without damage from the support surface by dissipating said layer of moisture dissipative layer.

Thus, there is provided a label for application to a support surface that is conveniently applied and removed from the support surface without damage to the label.

DETAILED DESCRIPTION OF THE INVENTION

Figure 1:
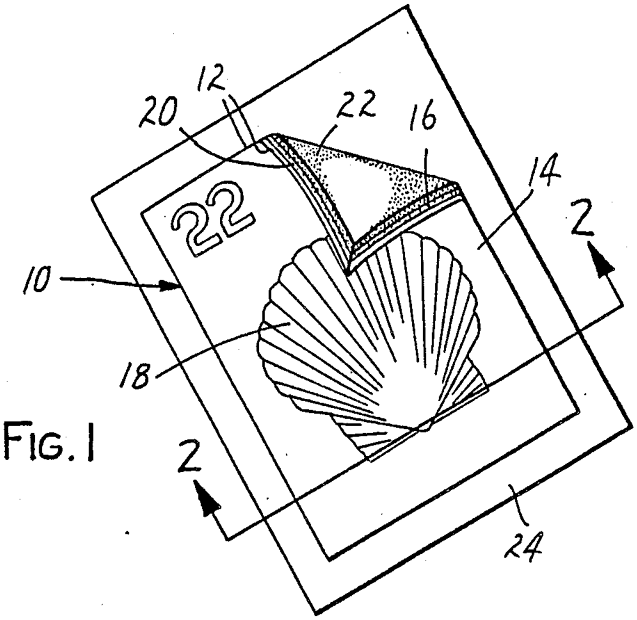
FIG. 1 is an isometric view of a printed label constructed according to this invention.
Figure 2:
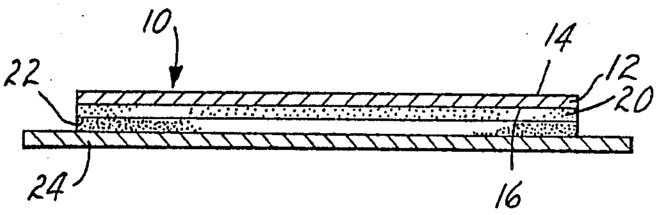
FIG. 2 is a cross sectional view along plane 2—2 of the label of FIG. 1.

Turning now to FIGS. 1 and 2, label 10 is shown including sheet member 12 including first major surface 14 and opposing second major surface 16. The sheet member is constructed of any suitable material, including polymeric films or metallic foils, but is preferably constructed from a paper suitable for use as postage stamps. Such paper is commonly referred to as stamp grade paper. Stamp grade paper is particularly resistant to "curling" or "flagging" particularly when applied to a support surface, such as an envelope, package or the like and is made from a mixture of bleached chemical wood pulps. The following is a non-exclusive list of products suitable for use as stamp grade paper:

1. Postage stamp paper available from the P.H. Glatfelter Co. of Spring Grove, Pa. having a weight of 65 pounds and a thickness of 0.0034 inches.
2. Dunn No. 55 Spectral Coated No. 019 stamp grade paper available from James River Corporation of James River, Va.
3. White coated postage stamp paper No. LP-57with barrier coating available from Henry & Leigh Slater Ltd. of Bollington-Maccelsfield-Chesire, England.
4. No. LP-57 stamp grade paper available from Paper Corporation of the United States of New York, N.Y.
5. No. LP-57 stamp grade paper available from Champion International Corporation of Stanford, Conn.

First major surface 14 of the sheet member preferably includes various indicia 18 such as figures or alphanumeric characters. The indicia is preferably printed on stamp grade paper by a gravure or intaglio printing process, as is known in the art. Further, the first major surface 14 of the sheet member, if used as a postage stamp, must also accept canceling ink.

A moisture dissipative layer 20 is applied to the second major surface 16 of the sheet member. For the purposes of this invention, the term "dissipative"includes both water soluble and water dispersible materials. The moisture dissipative layer may include a moisture activated adhesive such as is commonly used in conventional postage stamps. One substance which may be used for the moisture dissipative barrier layer of this invention is polyvinylpyrrolidone. The moisture dissipative layer may also include a barrier coating that prevents migration of materials through the sheet member from the second surface to the first surface that may discolor or obscure the indicia on the first major surface of the sheet member. Such a barrier coating that is also moisture dissipative is provided on the stamp grade paper marketed by Henry & Leigh Slater Ltd. of Bollington-Maccelsfield-Chesire, England under the trade mark LP-57.

A layer of pressure sensitive adhesive 22 is applied to the layer of moisture dissipative material opposite the second major surface of the sheet member for securing sheet member 12 to a support surface (not shown). Prior to use, the layer of pressure sensitive adhesive of the label may be covered by removable liner 24, such as a silicone release liner. It is preferable that the "dwell" or "tack" time for the pressure sensitive adhesive used be no greater than 15 seconds. It is also preferable that the pressure sensitive adhesive be stable over extended periods of time to avoid "bleeding" beyond the edges of the sheet member. Any suitable pressure sensitive adhesive may be used, such as is disclosed in U.S. Pat. No. Re. 24,906, the contents of which are incorporated herein by reference.

When it is desired to remove a label applied to a support surface, moisture may be applied to the label, such as by immersing the label and support surface in water. The moisture dissipates the layer of moisture dissipative material within a predetermined period of time, enabling the sheet member 12 to be separated without damage from the support surface and leaving the layer of pressure sensitive adhesive on the support surface. The pressure sensitive adhesive selected for the label of this invention preferably exhibits long shelf life characteristics as well as resistance to high humidity environments.

Figure 3:
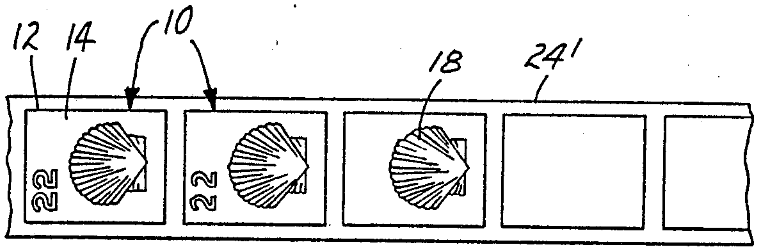
FIG. 3 is an isometric view of a plurality of labels of this invention adhered in a row to a common liner.

In FIG. 3, a plurality of labels 10, such as is shown in FIG. 1, are secured together with sheet members 12 adhered in a single row to a common liner 24. Each label 10 may be independently removed from liner 24 for application to a support surface. The liner and the sheet members may be constructed so as to be flexible, enabling the strip of labels to be curled into roll form for convenience.

Figure 4:
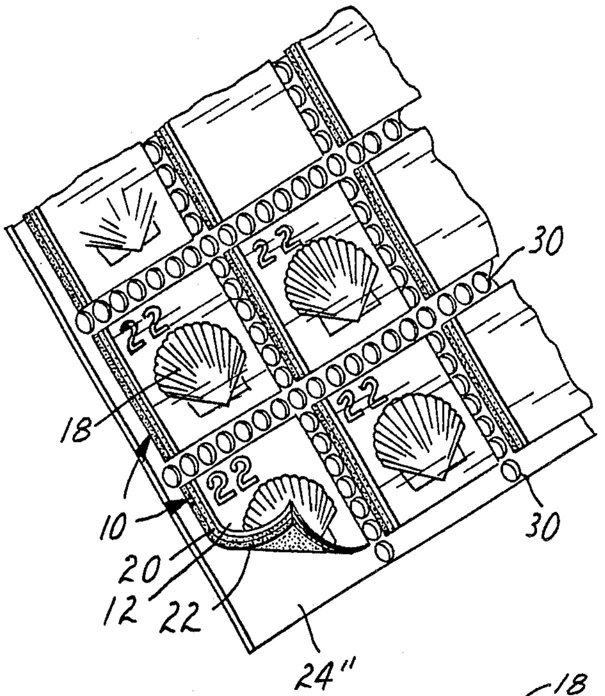
FIG. 4 is an isometric view of an alternate embodiment of this invention in which a plurality of labels according to this invention are adhered in an array of rows and columns to a common liner and separated by weakened lines in the liner.

FIG. 4 illustrates another alternate embodiment of the invention in which a plurality of labels 10 are adhered to common liner 24 in an array of rows and columns. Liner 24 includes rows and columns of weakened lines 30, which in the illustrated embodiment take the form of perforations, separating each of the labels. This arrangement enables each label to be removed with a portion of liner 24. The separated portion of the liner is removed when the label is applied to a support surface.

Figure 5:
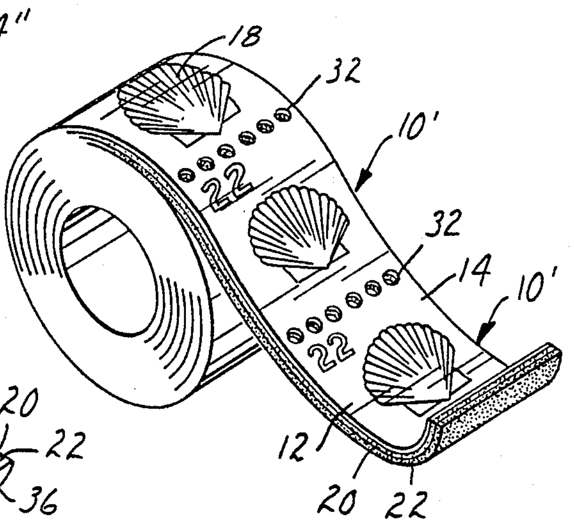
FIG. 5 is an isometric view of yet another alternate embodiment of this invention in which a plurality of labels are secured together in end to end relation to form a roll.

FIG. 5 shows another alternate embodiment of the labels, in which a plurality of labels 10' are secured together in end to end relation. The labels may be cut apart, but preferably, the labels are separated by intermediate weakened lines 32, which in the illustrated embodiment take the form of perforations. The labels are curled into a roll. The layer of pressure sensitive adhesive 22 of each successive ply of labels in the rolls is releasably applied to the sheet member 12 of the next adjacent ply. To facilitate the separation of adjacent plys, the first major surface 14 of each of the sheet members may be coated with a material, such as is disclosed in U.S. Pat. Nos. 2,532,011 and 2,607,711 the contents of which are incorporated herein by reference, that limits the adhesion of the first major surface of each sheet member to the layer of pressure sensitive adhesive of the next outermost label.

Figure 6:
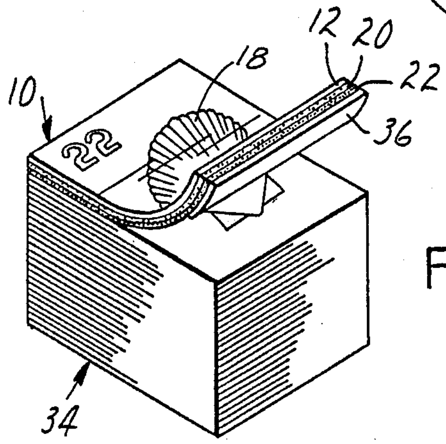
FIG. 6 is an isometric view of yet another embodiment of this invention in which a plurality of labels are reciprocally adhered together to form a pad.

FIG. 6 illustrates yet another alternate embodiment of this invention in which a plurality of labels 10 are reciprocally adhered together by their respective pressure sensitive adhesive layers to form a pad 34. The upper most label may be removed from the pad 34 by delaminating the layer of pressure sensitive adhesive 22 from the first major surface 14 of the sheet member 12 of the next adjacent label in the pad. To facilitate separation and removal of the labels from the pad, a removable liner 36 is applied to a minor portion and along one edge of the layer of pressure sensitive adhesive on each label.

The following are illustrative Examples of labels constructed according to the present invention:

| | EXAMPLES | | | | |
|---|---|---|---|---|---|
| | Example 1 | Example 2 | Example 3 | Example 4 | Example 5 |
| Stamp Grade Paper | Champion LP-57 Stamp Paper; Champion International Corp. Paper Division, Stamford, CT 06921 | Champion LP-57 Stamp Paper; Champion International Corp.<br>Stamford, CT 06921 | Champion LP-57 Stamp Paper; Champion International Corp.<br>Stamford, CT 06921 | Champion LP-57 Stamp Paper; Champion International Corp.<br>Stamford, CT 06921<br>Plaza, Stamford, CT 06921 | LP-57 with Barrier Coat; White coated Postage Stamp Paper Henry & Leigh Slater Ltd. Bollington-Macclesfield-Cheshine, England<br>Barrier Coating |
| Dissipative Layer | PVP-K30 Polyvinylpirpolidone<br>GAF Corporation<br>Wayne, NJ 07470 | Pancake Gum; Brownbridge, Kimberly Clark Corp.,<br>Troy, OH 45373 | Pancake Gum; Brownbridge, Kimberly Clark Corp.,<br>Troy, OH 45373 | Pancake Gum; Brownbridge, Kimberly Clark Corp.,<br>Troy, OH 45373 | |
| Pressure Sensitive Adhesive (Part of Each) | Kraton 1107 (Rubber) 100<br>Shell Chemical Company<br>Oak Brook, IL 60522-9008<br><br>Wingtack Plus (Resin) 100<br>The Goodyear Tire & Rubber Company<br>Akron, OH 44316<br><br>Irganox 1076 (Antioxidant) 1.5<br>CIBA-Geigy Corp.<br>Ardsley, NY 10502 | Kraton 1112 (Rubber) 100<br>Shell Chemical Company<br>Oak Brook, IL 60522-9008<br><br>Wingtack Plus (Resin) 100<br>Goodyear Chemical<br>The Goodyear Tire & Rubber Company<br>Akron, OH 44316<br>Irganox 1076 (Antioxidant) 1.5<br>CIBA-Geigy Corp.<br>Ardsley, NY 10502 | Kraton G1657 (Rubber) 100<br>Shell Chemical Company<br>Oak Brook, IL 60522-9008<br><br>Regalrez 1018 (Resin) 50<br>Reglarez 1078 (Resin) 100<br>Hercules Incorporated<br>Wilmington, DE 19899<br><br>Irganox 1076 (Antioxidant) 1.5<br>CIBA-Geigy Corp.<br>Ardsley, NY 10502 | 3M<br>Isooctyl Acrylate/<br>Acrylic Acid<br>95.5/4.5<br>25% solids in Heptane/<br>Isopropanol<br>70/30<br>3M | See Example 1 |
| Pressure Sensitive Adhesive (Part of Each) | Cyanox LTDP (Antioxidant) 1.5<br>American Cyanamid Co.<br>Wayne, NJ 07470<br>40% Solids in Toluene (All) | Cyanox LTDP (Antioxidant) 1.5<br>American Cyanamid Co.<br>Wayne, NJ 07470<br>40% Solids in Toluene (All) | Cyanox LTDP (Antioxidant) 1.5<br>American Cyanamid Co.<br>Wayne, NJ 07470<br>40% Solids in Toluene (All) | See Example 1 | See Example 1 |
| Silicone Release Liner | SBL 70 SC Silox E 280-0<br>Akrosil<br>Menasha, WI | SBL 70 SC Silox E 280-0<br>Akrosil<br>Menasha, WI | SBL 70 SC Silox E 280-0<br>Akrosil<br>Menasha, WI | SBL 70 SC Silox E 280-0<br>Akrosil<br>Menasha, WI | SBL 70 SC Silox E 280-0<br>Akrosil<br>Menasha, WI |

The present invention has now been described with reference to several embodiments thereof. It will be apparent to those skilled in the art that many changes can be made in the embodiments described without departing from the scope of the present invention. Thus, the scope of the present invention should not be limited to the structures described in this application, but only by structures described by the language of the claims and the equivalents of those structures.

What is claimed is:

1. A label for use with a support surface, comprising:

(a) a sheet member having first and second opposing major surfaces;

(b) a layer of moisture dissipative material applied to said second major surface of said sheet member; and (c) a pressure sensitive adhesive applied to said moisture dissipative layer opposite said second major surface of said sheet member for adhering said sheet member to the support surface;

(d) so that said sheet member may be removed without damage from the support surface by dissipating said layer of moisture dissipative layer.

2. The label of claim 1, further comprising a removable liner applied to said layer of pressure sensitive adhesive opposite said second major surface of said sheet member.

3. The label of claim 1, wherein said moisture dissipative layer includes a layer of moisture activated adhesive.

4. The label of claim 1, wherein said moisture dissipative layer includes a layer of polyvinylpyrrolidone.

5. The label of claim 1, wherein said sheet member is constructed of stamp grade paper.

6. The label of claim 1, wherein said sheet member is constructed of polymeric film.

7. The label of claim 1, wherein said sheet member is constructed of metallic foil.

8. The label of claim 1 further comprising indicia on said first major surface of said sheet member.

9. For use with a support surface, a plurality of labels, each of said labels comprising (a) a sheet member having a first major surface and an opposing second major surface, (b) a layer of moisture dissipative material applied to said second major surface of said sheet member, (c) a pressure sensitive adhesive applied to said moisture dissipative layer opposite said second major surface of said sheet member, and further comprising a common removable liner, wherein said sheet members are each releasably adhered to said common liner by said layer of pressure sensitive adhesive and each of said sheet members may be removed from said common liner and adhered to the support surface and then removed from the support surface by dissipating said moisture dissipative layer.

10. The plurality of labels of claim 9, wherein said common liner includes weakened lines about at least some of said sheet members, whereby said common liner may be divided to detach said sheet member from said common liner.

11. The plurality of labels of claim 10, wherein said weakened lines in said common liner are perforations.

12. For use with a support surface, a plurality of labels, each of said labels comprising (a) a sheet member having a first major surface and an opposing second major surface, (b) a layer of moisture dissipative material applied to said second major surface of said sheet member, (c) a pressure sensitive adhesive applied to said moisture dissipative layer opposite said second major surface of said sheet member, wherein said plurality of labels are detachably connected together in end-to-end relation to form a roll so that said labels may be detached from said roll and adhered to the support surface and then removed from the support surface by dissipating said moisture dissipative layer.

13. For use with a support surface, a plurality of labels, each of said labels comprising (a) a sheet member having a first major surface and an opposing second major surface, (b) a layer of moisture dissipative material applied to said second major surface of said sheet member, (c) a pressure sensitive adhesive applied to said moisture dissipative layer opposite said second major surface of said sheet member, wherein said labels are are reciprocally secured together by said layers of pressure sensitive adhesive on each of said labels to form a pad of said labels so that said labels may be sequentially removable from said pad and adhered to the support surface and then removed from the support surface by dissipating said moisture dissipative layer.

* * * * *